(12) United States Patent
Barsukov et al.

(10) Patent No.: US 10,044,213 B2
(45) Date of Patent: Aug. 7, 2018

(54) FAST CHARGING FOR LITHIUM ION BATTERY

(71) Applicant: Texas Instruments Incorporated, Dallas, TX (US)

(72) Inventors: Yevgen Pavlovich Barsukov, Richardson, TX (US); Michael A. Vega, Allen, TX (US); Brian Paul Alongi, Dallas, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 198 days.

(21) Appl. No.: 14/849,075

(22) Filed: Sep. 9, 2015

(65) Prior Publication Data

US 2017/0070061 A1    Mar. 9, 2017

(51) Int. Cl.
*H02J 7/04*    (2006.01)
*H02J 7/16*    (2006.01)
*H02J 7/00*    (2006.01)

(52) U.S. Cl.
CPC ..... *H02J 7/0077* (2013.01); *H02J 2007/0096* (2013.01); *Y02B 40/90* (2013.01)

(58) Field of Classification Search
CPC ........... H02J 7/045; H02J 7/047; H02J 7/0091
USPC ........................ 320/152–153, 160
See application file for complete search history.

(56) References Cited

U.S. PATENT DOCUMENTS

| | | | |
|---|---|---|---|
| 4,947,124 A | 8/1990 | Hauser | |
| 5,640,034 A | 6/1997 | Malhi | |
| 7,719,232 B2 | 5/2010 | Kelty et al. | |
| 7,928,699 B2 | 4/2011 | Kohn | |
| 8,531,158 B2 | 9/2013 | Wang et al. | |
| 2009/0104510 A1* | 4/2009 | Fulop | H01M 2/30 429/50 |
| 2011/0012562 A1* | 1/2011 | Paryani | H02J 7/047 320/152 |
| 2014/0062415 A1 | 3/2014 | Barsukov et al. | |

OTHER PUBLICATIONS

Choi, S.S.; Lim, Hong, Factors that affect cycle-life and possible degradation mechanisms of a Li-ion cell based on LiCoO2, Sep. 18, 2002, pp. 130-136, vol. III, Issue 1, Journal of Power Sources, South Korea.
PCT Search Report for Application No. PCT/US 2016-051025, dated Dec. 29, 2016.

* cited by examiner

*Primary Examiner* — David V Henze-Gongola
(74) *Attorney, Agent, or Firm* — Andrew Viger; Charles A. Brill; Frank D. Cimino

(57) ABSTRACT

A method and apparatus for fast charging a battery with optimal charging. In an arrangement, a system includes a battery charger for applying a voltage to a rechargeable battery; and a controller coupled to the battery charger and monitoring at least one of a battery voltage, a battery temperature, and the current flowing into the battery; wherein the system is configured to apply a charging current from the battery charger by calculating an open cell anode voltage and an anode resistance of the battery, and determining the charging current. In additional arrangements, lithium ion plating is prevented by the charging current. Additional methods and arrangements are disclosed.

25 Claims, 7 Drawing Sheets

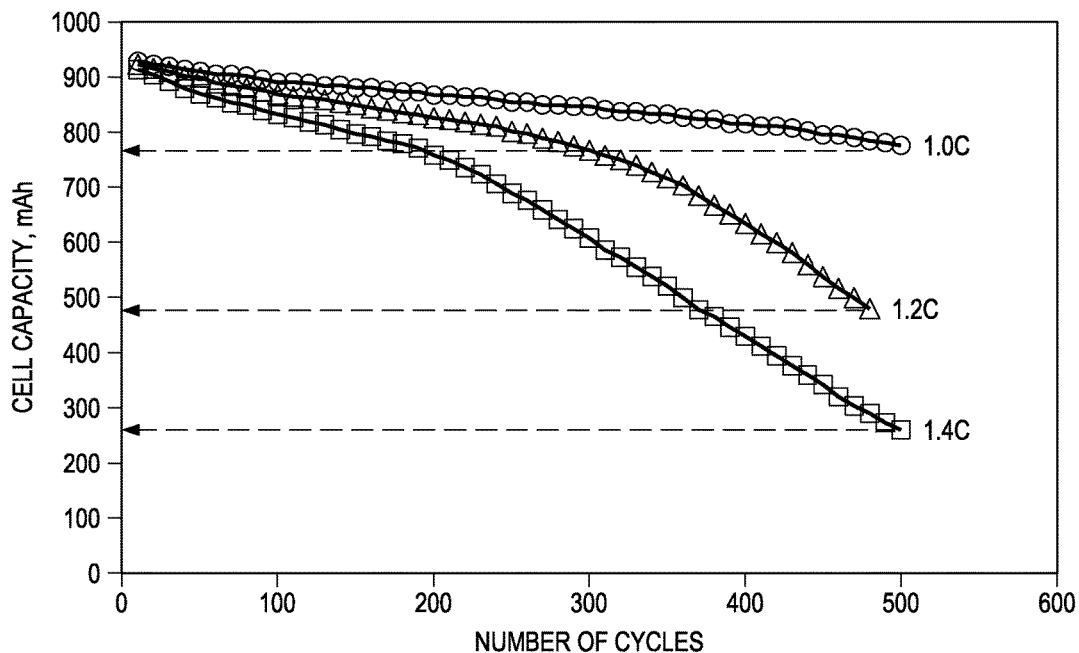
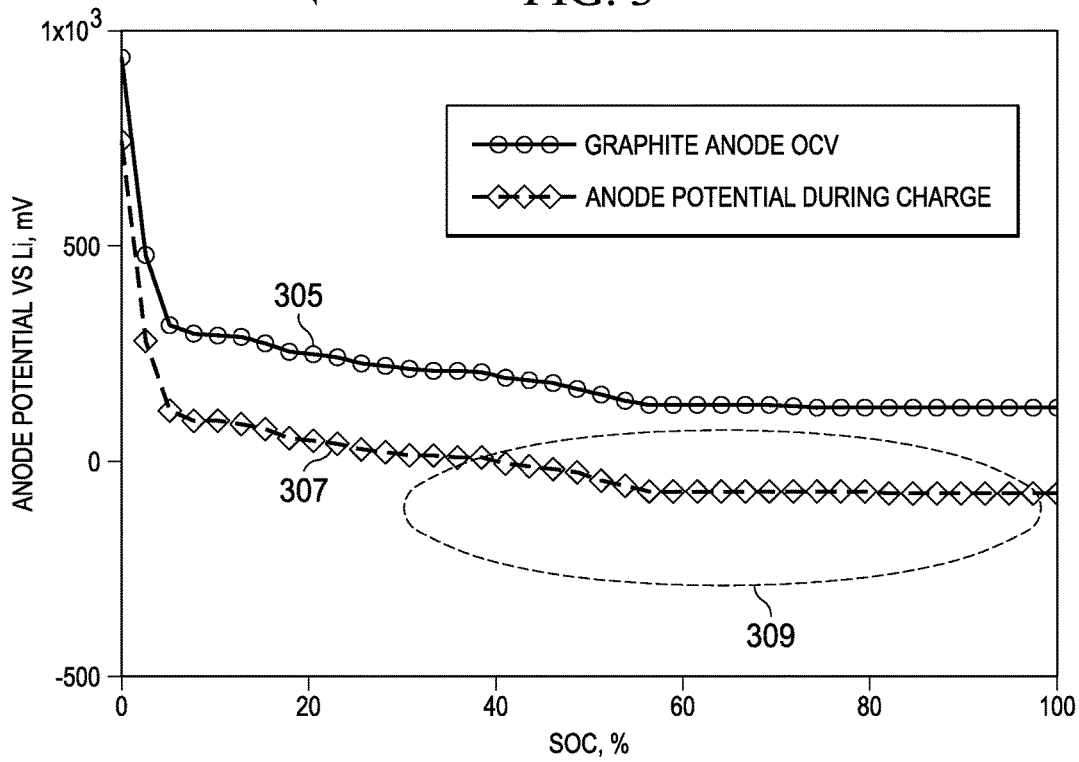

FAST CHARGING FOR LITHIUM ION BATTERY

TECHNICAL FIELD

The present application relates to generally to battery charging and in particular to rapid charging of rechargeable lithium batteries without battery degradation due to lithium plating.

BACKGROUND

The recent development of light weight rechargeable lithium batteries, with the capability to store comparatively large amounts of energy in a relatively small package, has made lithium batteries the power source of choice for portable electronic devices. Once manufactured, the life span of a lithium battery is largely determined by the type of use and by the recharge approaches used. While the use of the lithium ion battery is determined primarily by the consumer, the type of recharging can be determined by the device manufacturer and/or by the charger manufacturer. Although the battery manufacturer can supply recharging guidelines, these guidelines typically prescribe fairly conservative charge rates in order to keep any detrimental battery charging effects at a minimum. This leads to battery recharge times in the 2 to 4 hour range or even greater times. Consumers naturally prefer to charge portable devices in much shorter times in many cases, such as in less than 1 hour. Thus there is a conflict between the conservative charging guidelines written to ensure a long battery life, and the actual practices and preferences in the use of the batteries in the field. Improper rapid charging of lithium battery packs can greatly shorten the battery life, and in worst case scenarios, can lead to battery pack swelling or rupture of a battery pack and under certain circumstances, rapid charging can also create a possible fire risk.

A battery's capacity, described as the "C" rating, is defined as the sum of a constant current that a rated battery cell can deliver during a 20 hour discharge cycle and still remain within the rated voltage limits at room temperature. For example, an ideal battery that can produce 50 mA of current for 20 hours while staying within the prescribed voltage window would have a C rating of 50 mA×20 H=1000 mAh or 1 Ah. A "perfect" battery would be 100% efficient during charge and discharge. If a perfect battery had a C rating of 1 Ah, then it could deliver the 1 A for 1 hour, or 0.5 A for 2 hours, or 100 mA for 10 hours, or 50 mA in 20 hours, and so on. In addition, a perfect battery with a C rating of 1 Ah could be recharged in 1 hour by charging at 1 A for 1 hour, or 0.5 A in 2 hours, or 100 mA in 10 hours. Other terms commonly used in the description of a battery's charge and battery capacity are the state-of-charge (SOC) and the depth-of-discharge (DOD). SOC and DOD both have units of % and are complimentary definitions. SOC indicates the relative amount of energy stored in a battery compared to its fully charged state. DOD indicates how much of the battery's energy has been used compared to its fully charged state. For example, for a perfect 1 Ah battery, when drained of 0.25 Ah the battery would have a SOC of 75% and a DOD of 25%, and if drained of 0.5 Ah the battery would have a SOC of 50% and a DOD of 50%. The voltage of a battery is often specified as the open-cell-voltage (OCV) where the cell voltage is measured without external load. And the full-charge-capacity (FCC) is the capacity of the cell with a full charge at any given point in its life. Using the example of the perfect battery described above when new, the FCC would be 1 Ah. As the battery ages, the FCC is reduced.

While battery capacity can be arbitrarily increased or decreased with the addition/reduction of battery material, the voltage characteristic of a given battery chemistry remains independent of the battery capacity. For this reason, the discharge and recharge of a cell is commonly discussed in terms of the C rating. For example, if the perfect 1 Ah battery is discharged at a maximum rate of 1 C, then the maximum discharge rate would be 1 A. The same perfect battery, charged at a maximum rate of 2 C would see a maximum discharge current of 2 A.

In a rechargeable lithium ion battery, energy is stored and retrieved in a chemical reaction via the migration of lithium ions between electrode pairs. The positive electrode (cathode) and the negative electrode (anode) are both able to bind lithium ions. During discharge, the lithium ions move from the anode to the cathode, releasing energy in the process. During a charge cycle, an electric field created between the cathode and anode forces the lithium ions back to the anode, absorbing energy in the process. Under some circumstances, including high C rate charging, a small portion of lithium ions form metallic lithium and are deposited on the anode during the recharge phase. This lithium material partially reacts with electrolyte and is then no longer available for charge storage and as a result the capacity of the battery is diminished. This phenomenon is referred to as "lithium plating." The lithium plating reduces the capacity and the life of the battery.

In conventional prior known approaches, a prior known approach to battery charging methodology has two phases, a constant current or "CC" phase, followed by a constant voltage or "CV" phase. During the CC phase, a current that is considered a safe current for the battery is applied until the cell voltage reaches a target voltage, for example, 4.2 Volts, and then the current is reduced while the voltage is maintained in the constant voltage phase, until the current falls to a minimum when charging stops. Known prior battery chargers also monitor conditions such as temperature and may prior known approaches may stop charging when temperature falls below a minimum such as 10 degrees C., or 0 degrees C.

FIG. 1A illustrates in a flow diagram a known prior approach dual stage constant current CC and constant voltage CV or "CC/CV" charge process; and FIG. 1B illustrates a graph of a typical battery charge cycle using the CC/CV process.

The flow diagram illustrated in FIG. 1A shows the steps used in a controller for operating the CC/CV charge process. Step 110 begins the process. At step 111, the charge process begins. The maximum current is applied to the battery at this step. At step 113, the constant current phase begins. During this phase the charge process charges the battery at a predetermined maximum current. The current may be the maximum available from the charger, or, a maximum current considered safe according to manufacturer specifications, such as 1 C. The process continues at step 113 and tests to see if a maximum voltage "Max V" has been reached. Until the maximum voltage is reached, the constant current charging continues by remaining at step 113.

When the test at step 113 indicates that the maximum voltage Max V has been reached, the charging process transitions to a "constant voltage" mode of operation at step 115. During the constant voltage charging process, the current into the battery is allowed to fall as the battery reaches full capacity. At step 117 the current flowing into the battery is tested to see if the cutoff limit has been reached (current into the battery is measured and found to be less than a minimum charging current) and when the cutoff is reached, the process transitions to step 119, the "stop" state.

In FIG. 1B, the left vertical axis of charging graph 120 depicts the charge voltage which is represented by data line 124. The right vertical axis depicts the charge current which is represented by data line 122. The units of the right axis are labeled as C indicating the C rating of the battery. The bottom axis is the charge time in hours. The two distinct phases of a CC/CV charger are indicated near the top of the graph with the CC phase as 130 and the CV stage as 132 The maximum charge rate in this example is 1 C as indicated by the peak value of the charge current line 122 in the constant current or CC phase 130. Following the current line 122 from the CC phase into the constant voltage of CV phase to the last current value in the CV phase 132, the cutoff current is approximately 0.15 C. The maximum charge voltage is seen by the value of voltage line 124 in the CV stage 132 and is approximately 4.2V. In this example charging case, the total charge time is about 1 hours and 10 minutes as seen by the termination of the charge current line 122.

To achieve lower recharge times, the current in the CC phase can be increased to 2 C or higher. However, it is known that the life and capacity of the lithium battery is greatly diminished when repeatedly charging at these higher rates compared to charging at lower rates, such as 0.5 C. Obviously, a charging system that is able to charge a battery in the least amount of time, without accelerating battery degradation, is desired.

FIG. 2 is a graph that illustrates cell capacity degradation with increasing C rate. The data depicted in graph 200 illustrates the detrimental effects that charging a battery at a higher C rate can have on the usable capacity of a battery cell as are described in an article titled "Factors that affect cycle-life and possible degradation mechanisms of a Li-ion cell based on LiCoO2", Journal of Power Sources, Vol. 111, Issue 1, pp. 130-136, by S. S. Choi et. al. (2002). Referring to the graph of FIG. 2, it can be seen that when using a CC/CV charger with a charging rate as little as 1.4 C, the capacity of the cell illustrated in the graph has dropped to about 27% of its initial capacity in 500 charge cycles. The same chemistry cell, charged at a 1 C rate still retains about 800 mA after 500 cycles. As shown in the graph in FIG. 2, a higher constant current charging rate degrades a battery quickly and shortens battery life.

The open cell voltage (OCV) of a battery cell can be calculated as shown in Equation 1:

$$V_{cell} = V_{cathode} - V_{anode} \qquad \text{EQUATION 1}$$

Direct measurement of the battery voltages Vcathode and Vanode is typically done by inserting a $3^{rd}$ reference electrode in the electrolyte region of the battery. Because of the delicate nature of the procedure, it is typically only performed in a laboratory setting by the battery manufacturer. When successful, the cathode and anode potentials are extracted from a battery with very few cycles and usually at room temperature. However these voltages are not available for a battery in actual use because there is no $3^{rd}$ reference electrode.

Battery degradation is classified in two basic categories: active material loss and internal impedance increase. In the first category, active material loss, the loss of material reduces the available chemicals for the ionic processes needed to create current. Although battery manufacturers seal the batteries, there is still some electrolyte loss due to parasitic reactions inside the cell. A battery cell pack that is charged inappropriately can exhibit swelling due to the gas produced and the swelling can, in extreme cases, damage the device the battery pack is installed in.

In the second category, impedance increase, the usable amount of energy available for external loads is reduced by increases in the internal resistance. Increasing impedance increase is the prevalent degradation a lithium battery cell experiences. Internal resistance increases with age of the battery and with the number of charge/discharge cycles. Further, at lower temperatures, the internal resistance increases. When the internal impedance increases, lithium plating is more likely during charging as the increased internal impedance negatively affects internal potentials. Because of the impedance increase at lower temperatures, some prior known approach chargers include a cut off temperature sensor and will not charge below certain temperatures, like 10 degrees C. or 0 degrees C. However impedance increases also occur at higher temperatures than these and charging that is acceptable at room temperature may cause lithium plating at lower temperatures, particularly as the battery cells age.

Lithium plating causes both types of degradation, active material loss and internal impedance increase. When the lithium ions become lithium metal and react with the solvent, the number of lithium ions available to transport charge is reduced. In addition, as the lithium metal decomposition products accumulate at the anode, there are less locations for lithium ions to exchange their charge. Because of this dual degradation, it is desirable to avoid conditions that accelerate lithium plating. Lithium plating reduces capacity and life of the battery cells.

It is known that during charging of lithium ion battery cells, lithium plating occurs when the voltage drop across anode material causes the graphite surface potential at the anode of the lithium cells to fall below the lithium potential. FIG. 3 depicts in a graph 300 the limitations on charging presented by the lithium plating phenomenon. In graph 300, the vertical axis is a plot of the anode potential compared to the lithium potential, in volts. The horizontal axis illustrates the state of charge (SOC) in percent, for a charging cycle. At the left side of the graph, the SOC is at 0% and charging begins, the charging ends when the SOC is 100% representing a full charge. Trace 305 illustrates the graphite anode open cell voltage for a lithium ion cell. The OCV for the anode is greater than zero for the entire charging cycle. However, the trace 307 depicts the anode potential v. the lithium potential, For low temperature, or rapid charging, or for an aged battery cell, the internal resistance can increase, resulting in an anode potential that falls to zero or becomes negative compared to the lithium potential. This is shown inside the area 309 in FIG. 3, in this area, lithium plating can occur. Thus the lithium plating phenomenon is a limit on the rate of charge that can be achieved without damaging the battery. It is also known that the impedance of the battery changes with temperature. Because battery impedance increases at lower temperatures, charging at lower temperatures, for example when charging outdoors or in vehicles, can cause lithium plating to occur even at charging current levels that would be appropriate at room temperatures.

A charge methodology that avoids lithium plating and thus extends battery life while maintaining battery capacity is clearly desired. U.S. patent application Ser. No. 14/014, 195, published Mar. 6, 2014, filed Aug. 29, 2013, titled "METHOD AND APPARATUS OF CHARGING THE BATTERY WITH GLOBALLY MINIMIZED INTEGRAL DEGRADATION POSSIBLE FOR PREDEFINED CHARGING DURATION," naming Yevgen Barsukov et al.

as inventors, which is co-owned with the present application, is hereby incorporated herein by reference in its entirety. In the above referenced patent application, improvements are made in reducing the recharge time of a lithium cell. In laboratory testing and modeling of specific battery chemistry, multiple charging profiles are developed to suit battery age, impedance, temperature and state of charge (SOC). With the lithium chemistry empirically characterized, a set of optimized constant current-constant voltage (CC/CV) charging profiles can be loaded into a battery charging apparatus. These charging profiles can then be used to reduce the overall charge time while avoiding charging conditions that degrade the battery, including degradation due to lithium plating at high charge rates. The approach described in the above referenced patent application is a step forward beyond previous known prior approaches towards the goal of fast battery recharge without additional cell degradation. This approach requires substantial computations offline in order to characterize each of the particular battery cells and to create the CC/CV charging profiles for each battery pack made, and if the material or battery cells are modified, these computations must be repeated and new profiles are required. However, further optimization of the charging methodology is desired to further reduce the charge time without incurring additional battery degradation.

Improvements are thus needed in battery chargers and in methods for charging lithium ion batteries. The avoidance of battery degradation during charging would maintain battery cell capacity at higher levels over a larger number of cycles while extending battery life. Damage to the battery cells and to the equipment in which the battery cells are installed due to improper charging could be avoided.

SUMMARY

In arrangements of the present application, recognition is made that in charging batteries, optimal charging current should charge the battery quickly while avoiding battery degradation due to lithium plating. Methods and systems for charging batteries are provided where a computation for an open cell anode voltage is used to compute the charging current in a manner that avoids lithium plating problems, and these arrangements can be used to charge batteries at an optimal current.

In an example system arrangement, the system includes a battery charger for applying a current to a rechargeable battery; and a controller coupled to the battery charger and monitoring at least one of a battery voltage, a battery temperature, and current flowing into the battery; wherein the system is configured to apply a charging current from the battery charger to the battery during a battery charging cycle where the current is determined by calculating an open cell anode voltage and calculating an anode resistance of the battery, and determining the charging current from the calculated open cell anode voltage and the calculated anode resistance.

In a further arrangement, the above described system further includes an application processor coupled to the controller and configured to control the battery charger. In still another arrangement, the above described system is configured to compute the anode resistance using stored parameters for the anode resistance. In still a further arrangement, in the above described system, the system further comprises a CPU and an instruction store in the controller, the instruction store containing instructions configured to cause the CPU to calculate the charging current proportional to a computed open cell anode voltage divided by an anode resistance.

In additional arrangements, in the above described system, the system further includes a data store containing stored parameters for the battery including anode resistance parameters compensated for depth of discharge. In still another arrangement, in the above described system the controller further includes a data store containing stored parameters for the battery including resistance parameters compensated for battery temperature. In a further alternative arrangement, in the above described system the controller further includes inputs configured to receive a battery voltage, a temperature sensor for the battery, and to a current sensor for the battery. In still another arrangement, in the above described system, the controller is configured to control the battery charger to apply the charging current to the battery until a predetermined battery voltage is reached. In a further alternative arrangement, in the above described system, the controller is configured to control the battery charger to apply a constant voltage to the battery subsequent to the predetermined battery voltage being reached. In yet another arrangement, the above described system is provided wherein the system further includes a lithium ion battery coupled to the battery charger and the controller. In another alternative arrangement, in the above described arrangement, the system is configured to apply a charging current from the battery charger computed to avoid lithium plating within the lithium ion battery.

In another arrangement of the present application, a method for charging a battery includes providing a controller coupled to a battery charger; determining a charging current in the controller by computing an open cell anode voltage for the battery and determining the charging current from the computed open cell anode voltage and an anode resistance of the battery; and applying the charging current from the battery charger to the battery. In a further alternative arrangement, the above described method further includes determining whether a predetermined battery voltage has been reached; if the predetermined battery voltage has not been reached, computing the charging current from another computed open cell anode voltage and an anode resistance of the battery; and dynamically adjusting the charging current and applying the adjusted charging current to the battery.

In still additional alternative arrangements, the above described methods are performed, where if the predetermined battery voltage has been reached, the method includes computing a battery voltage from an open cell anode voltage computation, and applying the battery voltage from the battery charger. In a further alternative arrangement, in the above described methods, computing the charging current further comprises computing a maximum charging current that can be applied without causing lithium plating. In an additional arrangement, the above described methods further include wherein determining the charging current by computing an open cell anode voltage for the battery and determining the charging current from the computed open cell anode voltage further comprises: retrieving stored data corresponding to open cell anode voltage parameterized by temperature. In still another alternative arrangement, the above methods are performed and further include computing the open cell anode voltage by retrieving stored open cell anode voltages characterized by battery depth of discharge. In still another arrangement, in the above described methods, providing the controller further comprises providing a battery gauge integrated circuit device coupled to the battery charger.

In still another arrangement, a system for charging a lithium ion battery includes a battery charger integrated circuit having a battery output for outputting a battery charging current and a battery charging voltage to the lithium ion battery; and a battery gauge integrated circuit coupled to the battery charger integrated circuit and having inputs coupled to sense the battery voltage, a temperature sensor coupled to the battery, and a current sensor coupled to the battery; wherein the battery gauge integrated circuit is further configured to determine a charging current for charging the battery by computing an open cell anode voltage and an anode resistance and to control the battery charger to output the charging current. In still another arrangement, in the above described system, the charging current is computed to be a maximum charging current that will result in an open cell anode voltage that avoids lithium plating.

Use of the advantageous methods and apparatus of the arrangements that form aspects of the present application enable rapid charging of a rechargeable battery or a battery pack using a charging current that is optimized for recharge speed while avoiding lithium plating. The methods dynamically adjust the charging current during the charge cycle to avoid a lithium plating situation that would otherwise occur, thereby extending battery life and maintaining battery capacity over many cycles, in sharp contrast to the charging approaches of the prior art.

BRIEF DESCRIPTION OF THE DRAWINGS

For a more complete understanding of the illustrative examples of aspects of the present application that are described herein and the advantages thereof, reference is now made to the following descriptions taken in conjunction with the accompanying drawings, in which:

FIG. 2 is a graph that illustrates battery cell capacity for 500 cycles using different charging rates;

FIG. 3 illustrates in a graph the anode potential for a charging cycle of a battery;

Corresponding numerals and symbols in the different figures generally refer to corresponding parts unless otherwise indicated. The figures are drawn to clearly illustrate the relevant aspects of the illustrative example arrangements and are not necessarily drawn to scale.

DETAILED DESCRIPTION

Figure 1A:
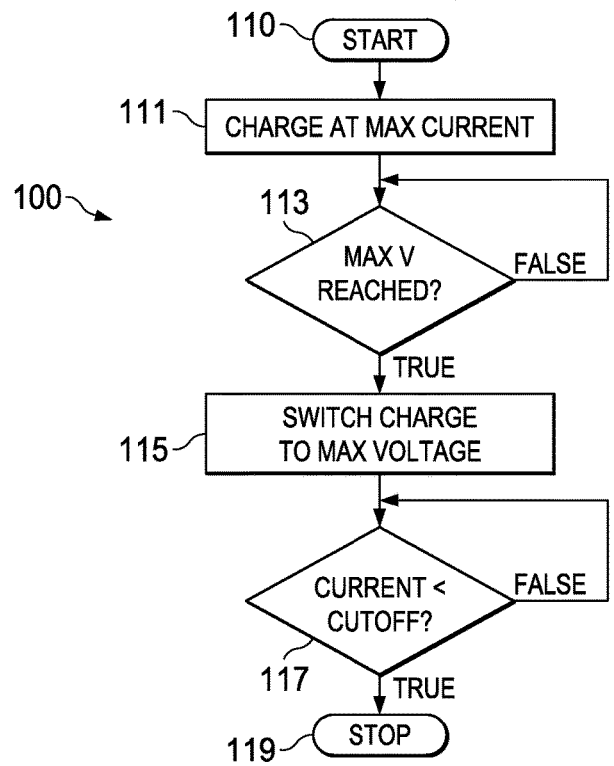
FIG. 1A illustrates a flow diagram for a CC/CV process of a known prior approach.
Figure 1B:
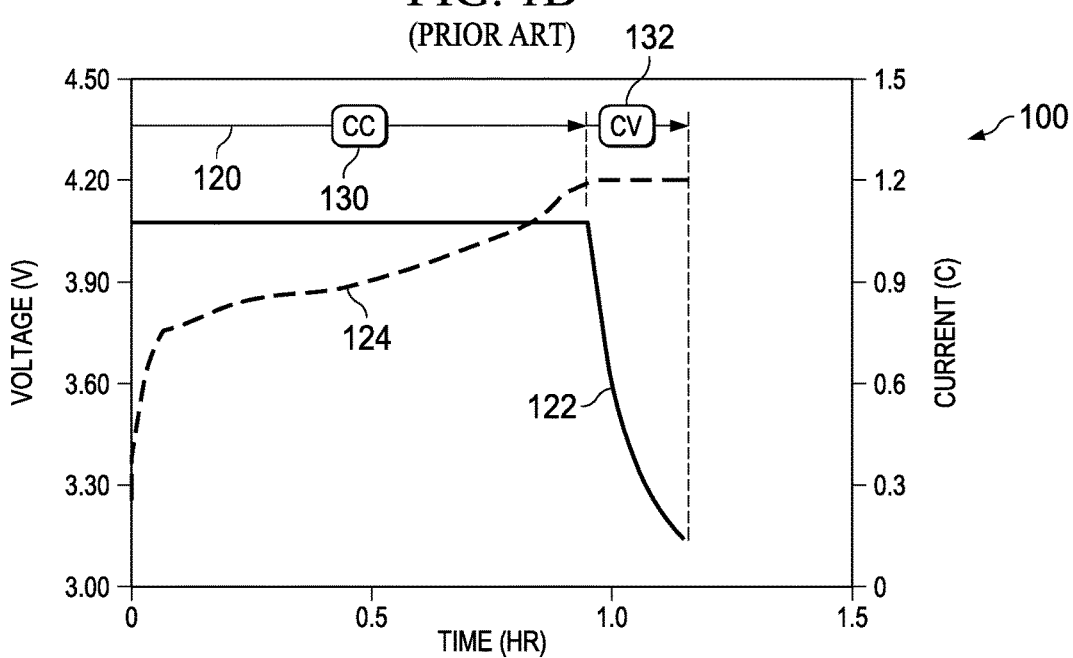
FIG. 1B illustrates a graph of the battery charging process of FIG. 1A.

The making and using of various examples of illustrative arrangements that incorporate aspects of the present application are discussed in detail below. It should be appreciated, however, that the illustrative examples disclosed provide many applicable inventive concepts that can be embodied in a wide variety of specific contexts. The specific examples and arrangements discussed are merely illustrative of specific ways to make and use the various arrangements, and the examples described do not limit the scope of the specification, nor do they limit the scope of the appended claims.

For example, when the term "coupled" is used herein to describe the relationships between elements, the term as used in the specification and the appended claims is to be interpreted broadly, and while the term "coupled" includes "connected", the term "coupled" is not to be limited to "connected" or "directly connected" but instead the term "coupled" may include connections made with intervening elements, and additional elements and various connections may be used between any elements that are described as "coupled."

The arrangements disclosed herein can be implemented in a variety of ways. The methods can be implemented and performed by programmable devices executing instructions, for example. The methods can be implemented in software or in firmware or machine language instructions. Alternatively, programmable logic can be used to form dedicated hardware solutions. Devices that can be configured to perform the methods, including field programmable gate arrays (FPGAs), complex logic programmable devices (CPLDs) and application specific integrated circuits (ASICs) can be used to implement the arrangements. A processor such as a CPU, microcontroller unit (MCU), mixed signal processor (MSP) or a digital signal processor (DSP) and memory including RAM, ROM, Flash, volatile and non-volatile types, EEPROM and the like can be used. The arrangements can be implemented using several commercially available integrated circuits on a circuit board or on a module to form a complete solution.

Aspects of the present application include a maximum life battery charger and methodology. In this arrangement, a charging apparatus is specifically configured to charge a lithium battery using a novel charging algorithm in which the charging current is optimized to a maximum current level that can be used without decreasing the anode electrode potential below lithium metal potential and therefore without causing lithium plating. The methods include a constant anode potential (CAP) phase and a subsequent constant voltage (CV) phase. These arrangements allow a lithium battery cell to be charged in the least possible time with an optimal charging current without accelerating battery degradation due to lithium plating. In sharp contrast to the prior approaches, the charging current is dynamically adjusted to provide an optimized maximum charging current on an ongoing basis during a first portion of the charging cycle, the CAP phase, that roughly corresponds to the prior "constant current" phase. The charging current is adjusted to prevent lithium plating and the battery degradation that results from overcharging. The method arrangements include information about the age, depth of discharge, and temperature of the battery and avoids overcharging by modeling the conditions within the battery at a given time and by performing calculations on an on-going basis and dynamically adjusting the charging current to reflect those conditions. The model includes information about the anode potential, thus avoiding lithium plating that can occur using the prior known solutions.

Figure 4:
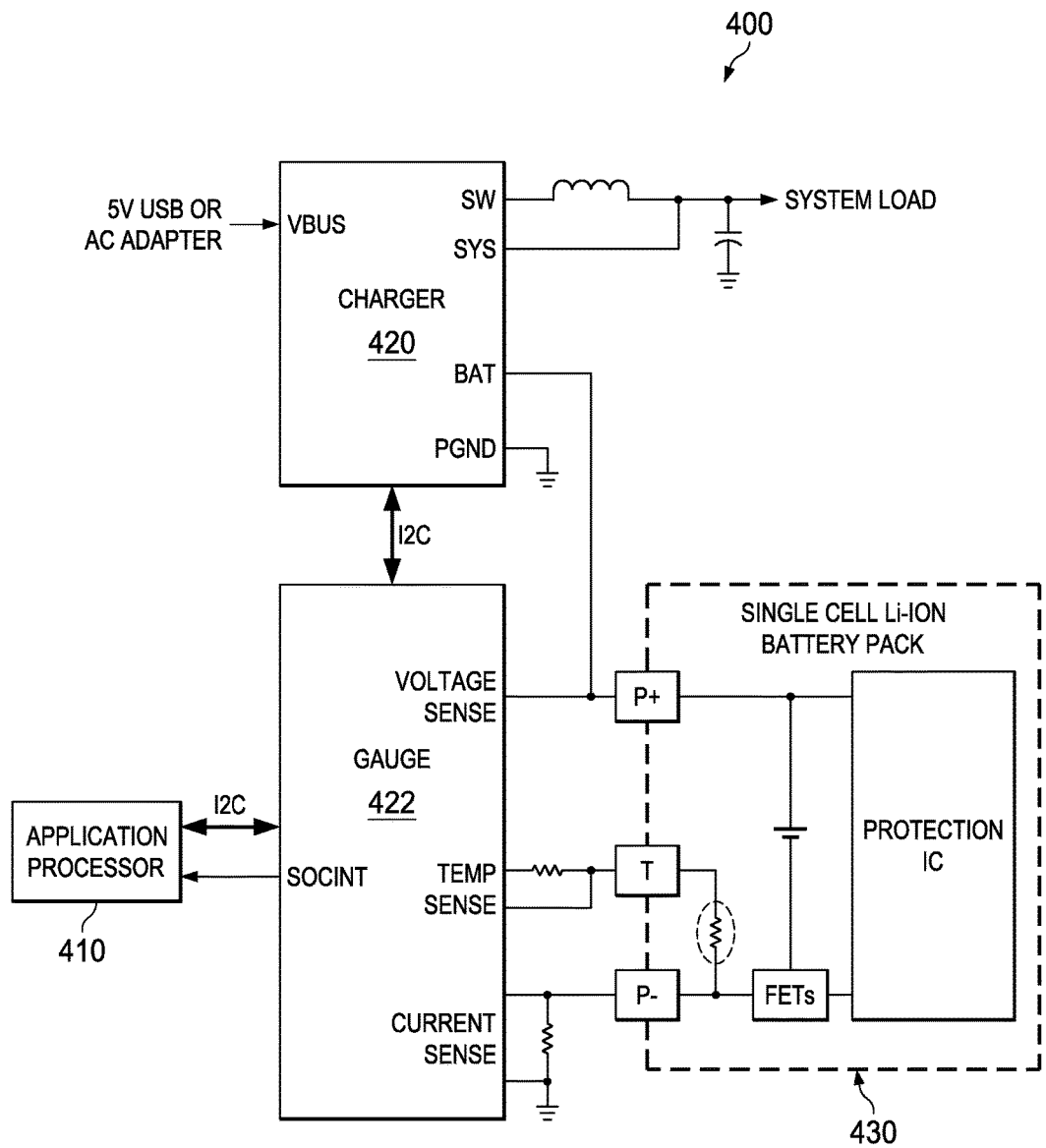
FIG. 4 illustrates in a circuit diagram a battery coupled to a battery charging apparatus for use with the arrangements.

FIG. 4 illustrates a typical schematic for a battery charging and monitoring apparatus that can be used with the arrangements of the present application. In circuit 400, application processor 410 is coupled to the battery cell gauge 422. Battery cell gauge 422 can be, for example, a stand-alone integrated circuit. The battery cell gauge 422 can also be implemented as a circuity board or system, or, in an alternative arrangement, as firmware that includes instructions for a programmable microprocessor. The battery cell gauge 422 is coupled to the lithium battery cell 430 and the charger 420. Again, charger 420 can be, in a typical example, a stand-alone integrated circuit. Alternatively charger 420 can be a circuit board or system. The charger 420 is coupled to the gauge 422 and the battery cell 430. In this example arrangement, the battery cell gauge 422 monitors the battery voltage and the input labeled "VOLTAGE SENSE", battery temperature at the inputs labeled "TEMP SENSE," and battery current at the inputs labeled "CURRENT SENSE." During operation in this arrangement, the battery cell gauge 422, which can be implemented for example as an integrated circuit or circuit board, operates the charger 420 during charge cycles using the interface labeled I2C. When the system is operating under battery power, the battery charger 420 provides the power to the system load from the battery 430, while the battery gauge 422 can provide information on the state of the battery such as remaining operating time to the system. When power is applied to the VBUS input of the charger 420, then the system load is powered by a DC supply that is provided, and, the charger 420 is used to charge the battery 430.

Figure 5:
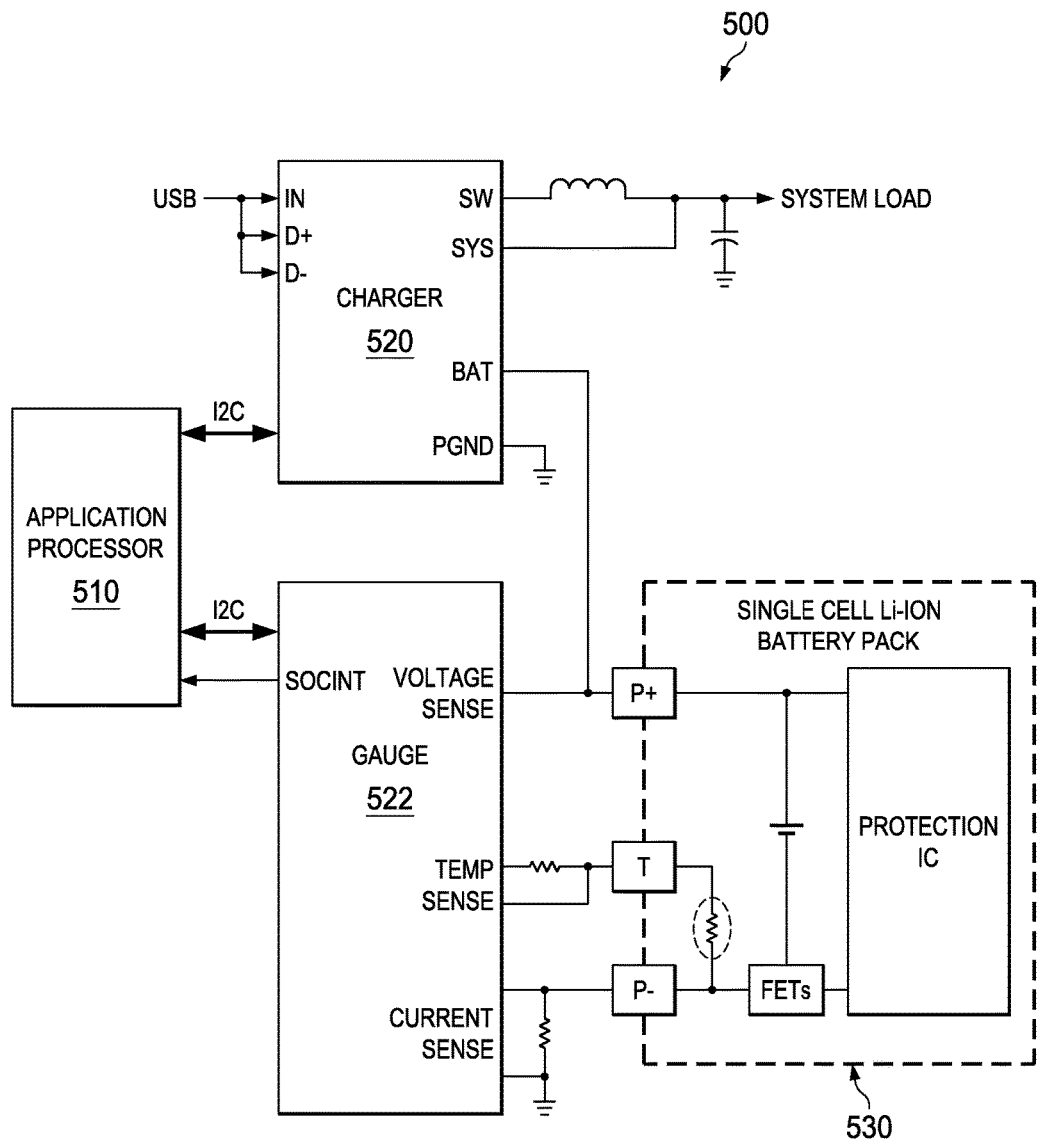
FIG. 5 illustrates in another circuit diagram a battery coupled to battery charging apparatus for use with the arrangements.

FIG. 5 illustrates another arrangement for a battery charging and monitoring apparatus that can be used with the arrangements of the present application. In arrangement 500, the application processor 510 is coupled to the charger 520 and coupled to the gauge 522. The gauge is coupled to the processor 510 and the lithium ion battery pack 530. The charger 520 is coupled to the application processor 510 and the lithium ion battery pack 530. The gauge 522 monitors the battery voltage, battery current and battery temperature. In the arrangement of FIG. 5, the application processor 510 controls the charger 520 using an I2C interface bus using information provided by the battery gauge device 522. A family of products that implement fuel gauges and battery chargers to form battery management solutions is commercially available from Texas Instruments Incorporated. An example commercially available battery gauge device is the BQ27530 Battery Management Unit Impedance Track Fuel Gauge; an example battery charger device is the BQ24161. Additional battery gauge and battery charger ICs are also available from Texas Instruments, Incorporated.

In both arrangements 400 and 500, many battery parameters, such as the number of charge and discharge cycles, the full charge capacity, impedance, voltage, temperature, SOC and calendar age, are captured and stored in memory within the gauge 422 or processor 510 so that the battery pack 430 or 530 can be charged in an efficient and safe manner. Further during battery powered operations the battery gauge and/or application processor can provide an estimate of remaining operating time to the system for display to a user, for example, using the battery parameters the gauge 422 or 522 can sense, e.g. temperature, current and voltage.

Aspects of the present application describe the configuration of a system including a charge apparatus to continuously supply charge current at an optimal level based on calculating the maximum charge current ($I_{CH\_MAX}$) as shown in Equation 2:

$$I_{CH\_MAX} = OCV_{AN}(DOD,T)/R_{AN}(DOD,T) \quad \text{EQUATION 2}$$

Where $I_{CH\_MAX}$ is the maximum charge current to be delivered to the cell, $OCV_{AN}$ is the estimated open cell voltage of the anode electrode at the current temperature and discharge level, $R_{AN}$ is the resistance of the anode, DOD is the depth of discharge, T is the temperature in degrees C., $$OCV_{AN} = OCV_{AN}25(DOD) + OCV_B(DOD)*(T-25) \quad \text{EQUATION 2A}$$

Where $OCV_{AN}$ is the estimated open cell voltage of the anode electrode in Equation. 2, $OCV_{AN}25$ is the $OCV_{AN}$ at 25° C., $OCV_B$ is temperature compensation coefficient for the open cell voltage at a given temperature, $$R_{AN}(DOD,T) = (R_A(DOD,T) - R_{TRACE})*F_{ANODE} \quad \text{EQUATION 2B}$$

Where $R_{AN}$ is the resistance of the anode electrode from EQ. 2, compensated for Depth of Discharge (DOD) and temperature (T), $R_A$ the resistance of the Anode compensated for DOD and T, $R_{TRACE}$ is the sum of all parasitic resistances present in the measurement of the cell impedance, $F_{ANODE}$ is the anode factor, the ratio between total cell resistance and anode resistance.

$$F_{ANODE} = \frac{(AN_{SHARE}(R_{PRESENT} - R_{NEW})) + ((R_{NEW} - R_{TRACE})F_{ANODE0}))}{(R_{PRESENT} - R_{TRACE})} \quad \text{EQUATION 2C}$$

Where $F_{ANODE}$ is the anode factor from EQ. 2B, $AN_{SHARE}$ is the contribution of the anode to the total cell impedance, $R_{PRESENT}$ is the last recorded cell impedance value, $R_{NEW}$ is the cell impedance value when the cell was new, $R_{TRACE}$ is the impedance value of the entire anode trace, $F_{ANODE0}$ is the initial value of $F_{ANODE}$.

The values of $F_{ANODE0}$ and $AN_{SHARE}$ are provided to the charger using data collected by off line cell characterization.

Equations 2, 2A, 2B and 2C have been discovered to provide a capability for dynamically adjusting the charging current applied to a battery on an on-going basis to ensure the open cell voltage at the anode (OCVan) is maintained at a positive voltage, that is a constant anode potential (CAP) is used. In the arrangements of the present application, methods incorporating these calculations are performed, charging batteries at an optimal charging current while avoiding lithium plating and thereby avoiding premature battery degradation. Charging can be performed as rapidly as possible while maintaining a healthy battery pack, and the lifetime of the battery pack can therefore be extended to a "maximum lifetime" that is many cycles longer than the battery life obtained using prior known approaches.

To use the equations, certain parametric information is needed. In one example approach that forms an arrangement that is an aspect of the present application, the open cell anode voltage, a depth of discharge, and a temperature dependency are obtained by performing a direct measurement with a three electrode battery that includes a reference electrode, a cathode electrode and an anode electrode.

In another alternative arrangement, an anode factor is obtained by performing direct measurement of the full cell impedance and a direct measurement of anode impedance using a three electrode battery that includes a reference electrode, a cathode electrode and an anode electrode.

In another further alternative arrangement, the open cell voltage anode, a depth of discharge, and a temperature dependency parameters are obtained by performing a decomposition of a full cell open cell voltage profile for the depth of discharge (DOD) into known anode and cathode open cell voltage profiles, the decomposition being accomplished through optimization of an anode state of charge, the cathode state of charge and the anode to cathode material ratios of a battery to achieve a closest match of the open cell voltage profiles for a depth of discharge OCV(DOD) to the relationship: the open cell voltage cathode for the depth of discharge (OCVcathode(DOD)) minus the open cell voltage anode for the depth of discharge (OCVanode(DOD)).

In a further arrangement, the resistance factor is found by fitting cycling data obtained at nominal and elevated charge rates for a battery to a battery degradation model that includes lithium plating degradation effects dependent on the resistance factor.

In another arrangement, the resistance factor is found by performing a pulse scan test on a battery, where a combination of charge pulse, relaxation, discharge pulse and relaxation is applied to the battery at different rates until a rate is determined where the effective impedance derived from a response to a charge pulse differs from the impedance derived from the discharge pulse; subsequently, after finding a limiting charge rate, the resistance factor is found by using known total cell impedance and the open cell voltage anode for the depth of discharge and the battery temperature of the test.

Figure 6A:
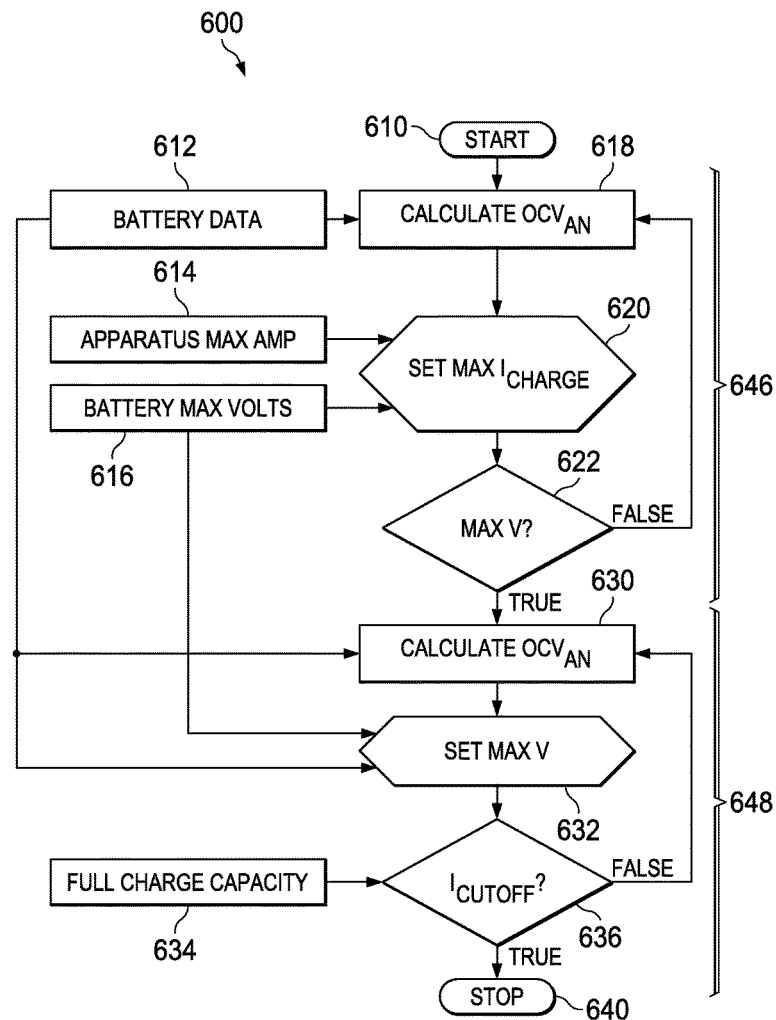
FIG. 6A illustrates in a flow diagram an arrangement for optimal charging of a battery and FIG. 6B illustrates in a graph a battery charging cycle using the process of FIG. 6A.

FIG. 6A illustrates in a flow diagram an example method arrangement 600 for charging of a battery, and a corresponding graph that depicts the charge voltage and current. The method uses a CAP/CV two phase approach. The method 600 has a start block 610 coupled to the following blocks in succession: 618, 620, 622, 630, 632, 636, and 640 as shown. Block 612 is coupled to 618 and 632, block 614 and block 616 are coupled to block 620. Block 616 is also coupled to block 632. Block 634 is coupled to decision block 636. The first portion of the flow chart, from start block 610 thru block 622, performs the constant anode potential optimized charging (CAP) of the charge operation indicated by bracket 646 in the graph 602 of FIG. 6B. The second portion of the flow chart, performed in block 630 thru the stop at block 640, performs a constant voltage (CV) stage of the charge operation in graph 602 indicated by bracket 648.

Figure 6B:
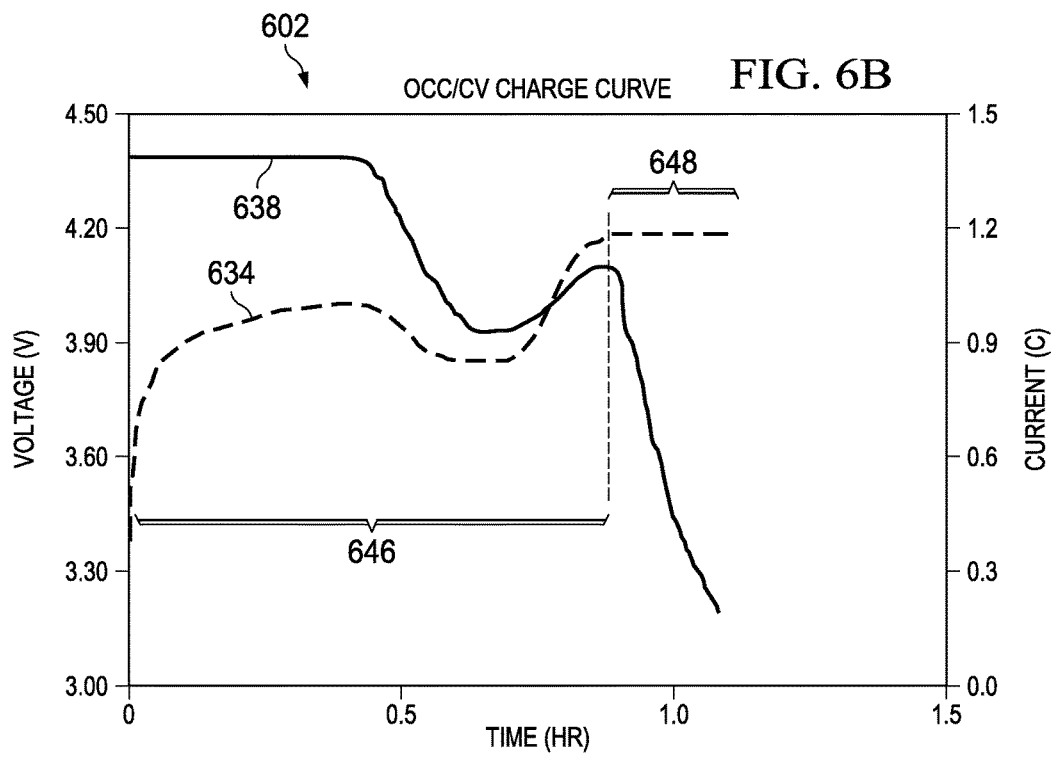

Graph 602 in FIG. 6B depicts the CAP/CV charging of FIG. 6A. The charging current is shown in curve 638 and the charge voltage is shown in curve 634. The left vertical or Y axis indicates the cell voltage, the right side Y axis indicates the charge current in units of battery capacity (C) or "C" rating. The horizontal or X axis illustrates the charge time in hours (hr). The portion 646 of the graph 602 illustrates the constant anode potential charge (CAP) stage and the traditional CV stage is illustrated in portion 648. The time brackets 646 and 648 in FIG. 6B correspond to the brackets on flow chart 600 in FIG. 6A with the same numerals.

Prior to beginning the charging process, the maximum charging current capability of the charge circuit is made available to the process as represented by block 614, (Apparatus Max Amp). Although in the example arrangement shown here, the maximum current obtained from Equation 2 that can be applied during the optimum current charging process is calculated dynamically and continuously in the novel charging approach of the present application, that calculated current may exceed the amount of current a particular charger can actually provide in some portions of the process, in which case the current is simply limited to the Apparatus Max Amp value at that time. Similarly, the maximum cell voltage for the lithium battery chemistry is made available to the process as represented by block 616 (Battery Max Volts). An initial FCC (Full Charge Capacity) is made available in block 634, Full Charge Capacity, and that value is updated and maintained over the life of the lithium battery cell by the battery charging and monitoring apparatus by storing data in a read/write memory. Battery data from cell characterization at the factory, and additional "real time" data such as temperature, cathode voltage and current, is made available in block 612, (Battery Data).

Various storage methodologies for retrieval of stored data, and for storing updated data, are provided with the battery charging apparatus. For example, the battery data from the manufacturer or factory can be provided as a look up table (LUT) in a ROM, EPROM or FLASH memory that retains data when no power is available. The data needed to calculate the maximum current is provided either by a battery gauge circuit as shown in FIGS. 4, and 5 for example, or from values stored in a memory that can be used by the battery charging apparatus to make the calculations in Equations 2, 2A, and 2B. For example the anode factor Fanode is stored from measurements made by the battery manufacturer or by the charger manufacturer and can be stored as a look up table, for example.

In the flow diagram in FIG. 6A, the charging process starts in step 610 and proceeds to the calculation of the open cell anode voltage ($OCV_{AN}$) at block 618. The calculations are performed using equations 2A and 2B. The equations take into account the information at Battery Data 612 which includes the cell impedance, battery age, DOD and cell temperature as recorded by the charging apparatus for this specific lithium battery cell. In block 620 of the flow diagram, Equation 2 is performed using the open cell anode voltage OCVan to determine the maximum charge current that can be applied ($I_{CH\_MAX}$) while charging in a manner to prevent lithium plating. The charge current for the charging process is limited by $I_{CH\_MAX}$. In an example where the charger can only supply a lower current (Apparatus Max. Amp) based on the maximum current capability 614 of the charger, then that lower current will be the maximum charge current used for that time period. Block 620 also comprehends the maximum charge voltage and will limit the charge current to ensure the maximum battery voltage 616 is not exceeded. Following the setting of the charge current 620 a test and decision is formed in block 622. The test performed in block 622 determines if the cell voltage is now equal to or has exceeded the maximum cell voltage. If false, then the continuous evaluation of the charge current continues back at block 618. Otherwise, if the maximum voltage has been reached, the charge process exits the CAP stage and proceeds to block 630 where the constant voltage or CV stage begins. During the CAP process steps 618 through 622, the charging apparatus, such as 400 in FIG. 4 or 500 in FIG. 5 for example, continues to update various battery data 612 including DOD, battery age, battery voltage and temperature which allows fresh anode voltage and anode resistance calculations to be made to keep the constant anode potential (CAP) (since the OCVanode cannot be measured and so, must be calculated as shown in Equation 2).

In the CV charging stage, beginning with step 630 in FIG. 6A, in an example the open cell anode voltage ($OCV_{AN}$) is calculated using equation 2A and also utilizing equation 2B. These equations take into account battery data 612 which includes the cell impedance, battery age, and DOD and cell temperature as recorded by the charging apparatus for this specific lithium battery cell. With the $OCV_{AN}$ determined along with the max battery voltage 616 and battery data 612, the charge voltage is set in block 632 as the lower of the voltages. As indicated in the current data 638 shown in graph 602 in the CV stage 648, in order to meet the lower of the charge voltages, the charge current 638 typically drops. A test of the charge current is performed in block 636. The final charge current $I_{CUTOFF}$ may be determined to be a portion, typically 5% to 10%, of the full charge capacity 634. When the charge current is less than the predetermined $I_{CUTOFF}$, charging is terminated in block 640. Otherwise the flow loops back to block 630 where $OCV_{AN}$ is again computed.

Graph 602 in FIG. 6B depicts the operation the CAP/CV charger described in the present application by showing sample charge voltage and charge current data for the CAP/CV charger. In graph 602, the CAP phase is indicated by time frame 646, the CV phase is indicated by time frame 648 and these two time frames are aligned with the data lines in graph 602. The dashed line indicate the charge voltage of the CAP/CV charger, with the CAP/CV charge current as curve 638 and the CAP/CV charge voltage as curve 634. In this non-limiting, illustrative example, the maximum charge current capability of the charger is 1.35 C and the maximum battery charge voltage is 4.20V.

Utilizing aspects of the current application, the CAP charge current 632 begins at the charger maximum current of 1.35 C in graph 602. The current is limited by the maximum capability of the charging apparatus. Following the charge current data line 632 right to near the 0.5 hour position, the current level drops below the maximum current of 1.35 A thereby protecting the battery from lithium plating that could otherwise occur. The charge current is reduced below the 1 C charge level close to 0.9 C and then gradually rises back to near 1.0 C at the end of the CAP stage 646. For the last portion of the charging, the CV stage 648, the maximum battery voltage has been reached so the charge current is continually reduced until it falls below the cutoff current. At that time the charging is terminated.

The CAP/CV charge profiles depicted in this example are dependent on the battery age, SOC, temperature and charger capacity and therefore are not the only charge profile that the arrangement can produce. In addition, it is advisable that a guard band, such as 10% to 20%, be incorporated within the calculation of EQUATION 2 to ensure that no lithium plating will occur due to a measurement tolerance or calculation rounding error.

Figure 6C:
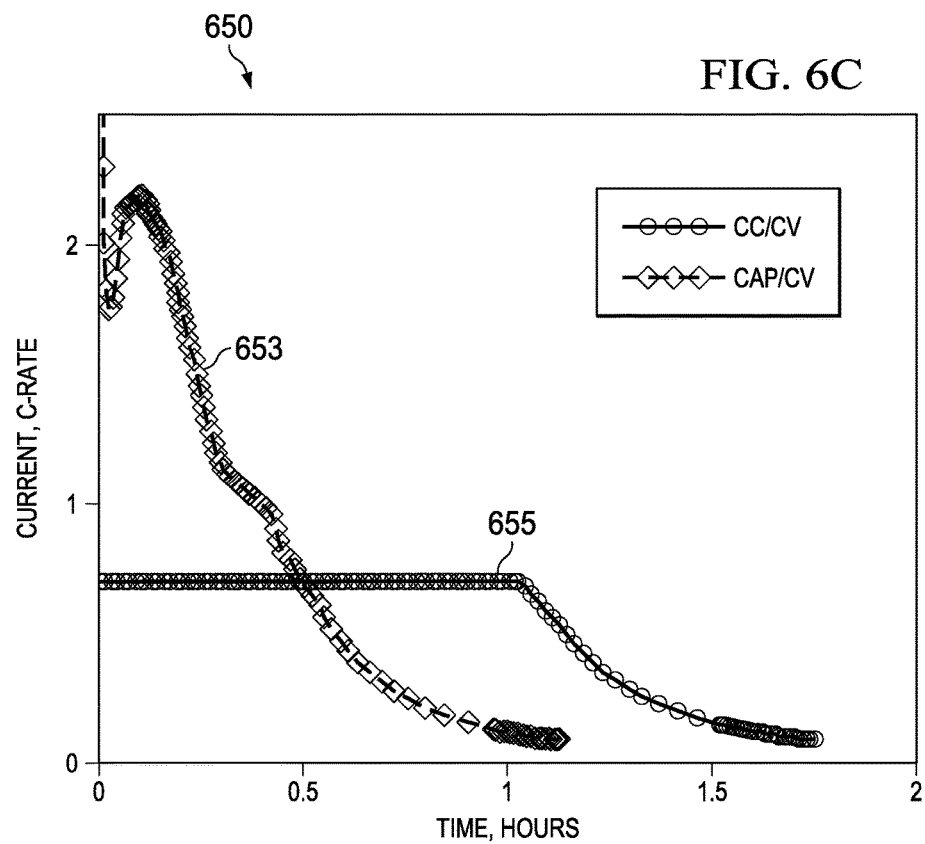
FIG. 6C illustrates in a comparison graph the charge time for a charging cycle using the arrangements of the present application and a prior known approach.

FIG. 6C compares the results obtained using an example CAP/CV charging arrangement of the present application to a constant current/constant voltage (CC/CV) charging cycle of a prior known approach. Graph 650 is a plot of the charging current (Current) depicted on the vertical axis in terms the C rate, v. the charging time on the horizontal axis, in hours. The line 653 depicts the charging current and charge time for the CAP/CV approach of the present application, while the line 655 depicts the results obtained for a traditional CC/CV charging approach. The total time required for the CAP/CV approach in this non-limiting, illustrative example, was just over 1 hour. The total time required for the CC/CV cycle of the known prior approaches was about 1.75 hours. The CAP/CV approach begins charging at a relatively high current level at time 0 hours, and this current is initially increased to above 2 C rate. However, as the dynamically adjusted current is determined, the charging current is reduced (to avoid the possibility of lithium plating) and after the maximum voltage is reached, the current continues to reduce to the end of the charging time (the last phase is a constant voltage phase). In contrast, the prior known approach begins with a constant current that is reduced to less than 1 C, and maintained for a long time, over 1 hour in the graph 650, and then once the maximum voltage is reached, the current falls until the end of the charging cycle.

As can be seen in the graph 650 in FIG. 6C, use of the CAP/CV approaches with the optimized charging current of the present application thus results in a substantially shorter charging time, while lithium plating is avoided, increasing battery life and maintaining charge capacity over the battery life (since increases in internal resistance are also avoided).

Figure 7:
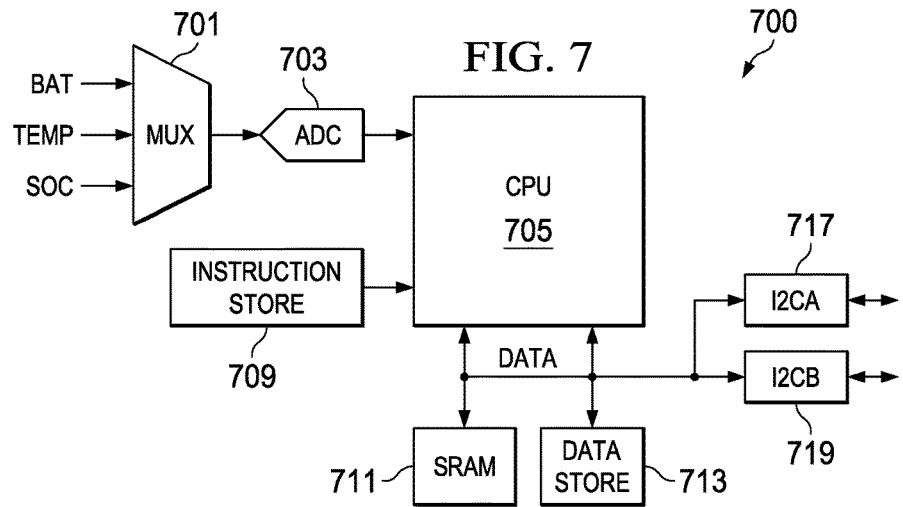
FIG. 7 is a simplified block diagram of a battery gauge circuit for use with the arrangements.

FIG. 7 depicts in a simplified circuit diagram for an apparatus such as a battery gauge for implementing the method arrangements of FIG. 6. In FIG. 7, a circuit 700 which can be implemented as a stand-alone integrated circuit, as part of a larger integrated circuit, or as a circuit board or module, is shown in a simplified circuit diagram. Inputs for the battery voltage (BAT), the temperature sensor (Temp) and the state of charge (SOC) are input to a multiplexer 701. The output of the multiplexer 701 is fed into at least one analog to digital converter (ADC) 703. The analog to digital converter outputs digital data for use by the CPU 705. CPU 705 is further coupled to a memory for storing instructions labeled Instruction Store 709; these instructions can include program code for configuring the CPU 705 to perform the CAP/CV method of FIG. 6A, for example. In addition the CPU 705 is coupled to a data buss DATA which is coupled to static RAM 711 and a non-volatile storage Data Store 713 for storing battery parameters such as the anode factor Fanode, Ranode, and the age of the battery, the number of cycles, temperature compensation factors for the calculation of the potential OCVanode, Ranode, and the other parameters of the equations shown above. Data store 713 can include data stored as a look up table (LUT), for example. The battery gauge circuit 700 can be coupled to the battery charger and/or the application processor as shown in FIGS. 4 and 5 above, for example, using I2C interfaces I2CA 717 and I2CB 719.

Figure 8:
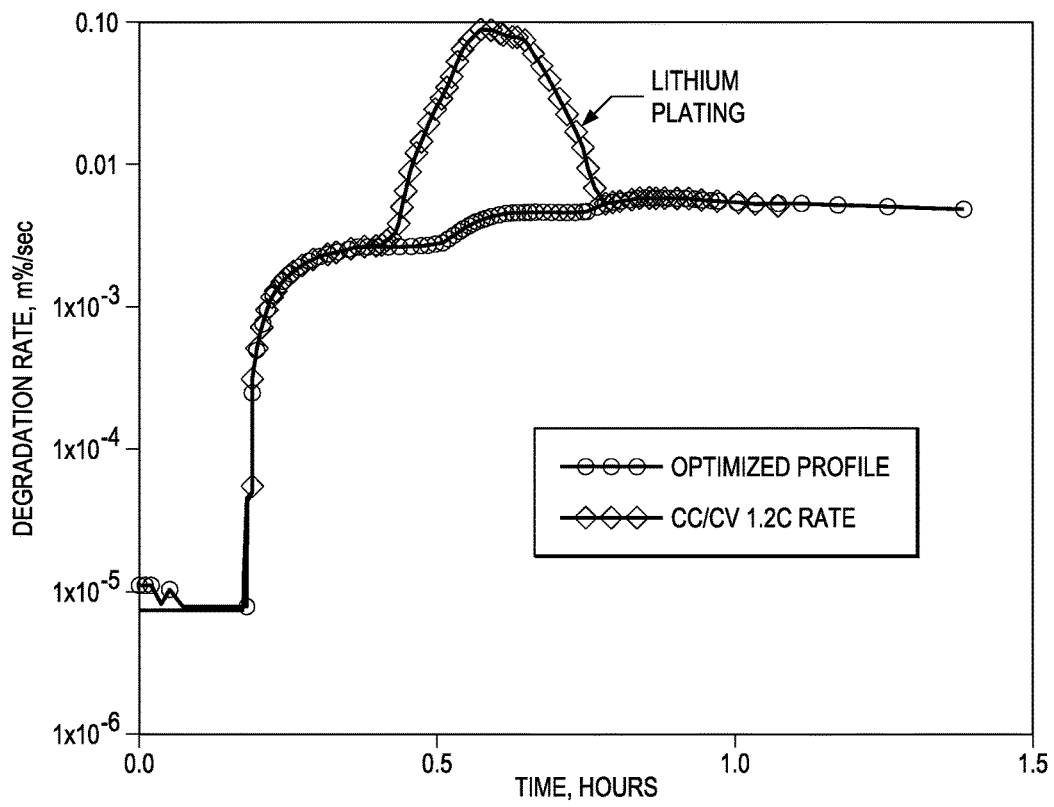
FIG. 8 is a graph comparing the battery degradation rate measured for a conventional CC/CV battery charging process to an optimized charging process incorporating the arrangements of the present application.

FIG. 8 depicts in a graph a comparison of battery degradation as a percentage rate/second plotted on the vertical axis and time on the horizontal axis. An optimized charging profile, such as can be accomplished using the method of FIG. 6A, for example, is compared to prior known constant current/constant voltage or CC/CV approach. The degradation for the prior known approach has a peak value between about 0.4 and 0.6 hours. This peak degradation of the battery indicates that for that portion of the charging cycle, lithium plating is occurring. For the optimized charging profile such as one achieved using the example arrangements of the present application described herein, for example, the battery degradation curve is fairly constant and does not indicate the lithium plating problem. This occurs because the novel charging profiles used are arranged to avoid the conditions that cause lithium plating. The arrangements of the present application use a continuous dynamic adjustment to the charging current in the first portion (CAP) of the charging profile, a constant anode potential is maintained. This phase of the novel arrangements roughly corresponds to the "constant current" portion of the prior known approach, however in the arrangements provided in the present application the charging is performed in a manner determined to avoid the lithium plating phenomenon of the prior approaches.

As described above, in some arrangements a battery gauge can control a battery charger, in other arrangements, the battery gauge can provide sensed and stored data parameters to the application processor which can then control the battery charger. In another arrangement, the battery charger and battery gauge circuits can be implemented as a single integrated circuit, for example.

Various modifications can also be made in the order of steps and in the number of steps to form additional novel arrangements that incorporate aspects of the present application, and these modifications will form additional alternative arrangements that are contemplated by the inventors as part of the present application and which fall within the scope of the appended claims.

Although the example illustrative arrangements have been described in detail, it should be understood that various changes, substitutions and alterations can be made herein without departing from the spirit and scope of the present application as defined by the appended claims.

Moreover, the scope of the present application is not intended to be limited to the particular illustrative example arrangement of the process, machine, manufacture, and composition of matter means, methods and steps described in this specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding example arrangements described herein may be utilized according to the illustrative arrangements presented and alternative arrangements described, suggested or disclosed. Accordingly, the appended claims are intended to include within their scope such processes, machines, manufacture, compositions of matter, means, methods, or steps.

What is claimed is:

1. A system, comprising:
    a battery charger for applying a current to a rechargeable lithium-ion battery with an anode electrode; and
    a controller coupled to the battery charger and monitoring at least one of a battery voltage, a battery temperature, and current flowing into the battery;
    wherein the system is configured to apply a charging current from the battery charger to the battery during a battery charging cycle, the charging current based on a charging voltage in which a potential of the anode electrode is less than a lithium metal potential of the lithium-ion battery, including calculating an open cell anode potential, calculating an anode resistance of the battery, and calculating the charging current proportional to the calculated open cell anode potential divided by the calculated anode resistance.

2. The system of claim 1, further comprising an application processor coupled to the controller and configured to control the battery charger.

3. The system of claim 1, wherein the system is configured to compute the anode resistance using stored parameters for the anode resistance.

4. The system of claim 1, wherein the system further comprises a CPU and an instruction store in the controller, the instruction store containing instructions configured to cause the CPU to calculate the charging current.

5. The system of claim 1, wherein the system further comprises a data store containing stored parameters for the battery including anode resistance parameters compensated for depth of discharge.

6. The system of claim 1, wherein the controller further comprises a data store containing stored parameters for the battery including resistance parameters compensated for battery temperature.

7. The system of claim 1, wherein the controller further comprises inputs configured to receive a battery voltage, a battery temperature from a temperature sensor for the battery, and to a battery current from a current sensor for the battery.

8. The system of claim 1, wherein the controller is configured to control the battery charger to apply the charging current to the battery until a predetermined battery voltage is reached.

9. The system of claim 8, wherein the controller is configured to control the battery charger to apply a constant voltage to the battery subsequent to the predetermined battery voltage being reached.

10. The system of claim 1, wherein the rechargeable lithium-ion battery is coupled to the battery charger and the controller.

11. The system of claim 10, wherein the system is configured to apply a charging current from the battery charger computed to avoid lithium plating within the lithium ion battery.

12. A method for charging a lithium-ion battery including an anode electrode, comprising:
    providing a controller coupled to a battery charger;
    determining a charging current in the controller based on a charging voltage in which a potential of the anode electrode is less than a lithium metal potential of the lithium-ion battery, including calculating an open cell anode potential, calculating an anode resistance of the battery, and calculating the charging current proportional to the calculated open cell anode potential divided by the calculated anode resistance and applying the charging current from the battery charger to the battery.

13. The method of claim 12, and further comprising:
    determining whether a predetermined battery voltage has been reached;
    if the predetermined battery voltage has not been reached, computing the charging current from another computed open cell anode voltage and an anode resistance of the battery; and
    dynamically adjusting the charging current and applying the adjusted charging current to the battery.

14. The method of claim 13, and where if the predetermined battery voltage has been reached, computing a battery voltage from an open cell anode voltage computation, and applying the battery voltage from the battery charger.

15. The method of claim 12, wherein computing the charging current further comprises computing a maximum charging current that can be applied without causing lithium plating.

16. The method of claim 12, wherein determining the charging current by computing an open cell anode voltage for the battery and determining the charging current from the computed open cell anode voltage further comprises:
    retrieving stored data corresponding to open cell anode voltage parameterized by temperature.

17. The method of claim 16, and further comprising computing the open cell anode voltage by retrieving stored open cell anode voltages characterized by battery depth of discharge.

18. The method of claim 12, wherein providing the controller further comprises providing a battery gauge integrated circuit device coupled to the battery charger.

19. The method of claim 12 wherein the open cell anode voltage, a depth of discharge, and a temperature dependency are obtained by performing direct measurement with a three electrode battery that includes a reference electrode, a cathode electrode and an anode electrode.

20. The method of claim 12 where an anode factor is obtained by direct measurement of full cell impedance and of anode impedance using a three electrode battery that includes a reference electrode, a cathode electrode and an anode electrode.

21. The method of claim 12 wherein the open cell anode voltage, a depth of discharge, and a temperature dependency are obtained by performing a decomposition of a full cell open cell voltage profile for a depth of discharge into known anode and cathode open cell voltage profiles, the decomposition being accomplished through optimization of an anode state of charge, a cathode state of charge and using anode to cathode material ratios to achieve a closest match of the open cell voltage profiles for a depth of discharge OCV (DOD) to the relationship: the open cell voltage cathode for the depth of discharge (OCVcathode(DOD)) minus the open cell voltage anode for the depth of discharge (OCVanode(DOD)).

22. The method of claim 12 wherein the resistance factor is determined by fitting cycling data obtained at nominal and elevated charge rates for a battery to a degradation model that includes lithium plating degradation effects dependent on the resistance factor.

23. The method of claim 12 wherein the resistance factor is determined by performing a pulse scan test on a battery, wherein a combination of charge pulse, relaxation, discharge pulse and relaxation is applied to the battery at different rates until a rate is determined where effective impedance derived from a response to a charge pulse differs from the impedance derived from discharge pulse; subsequently, after finding a limiting charge rate, the resistance factor is found by using known total cell impedance and the open cell voltage anode for the depth of discharge and the battery temperature of the test.

24. A system for charging a lithium ion battery including an anode electrode, comprising:
a battery charger integrated circuit having a battery output for outputting a battery charging current and a battery charging voltage to the lithium ion battery; and
a battery gauge integrated circuit coupled to the battery charger integrated circuit and having inputs coupled to sense the battery voltage, a battery temperature from a temperature sensor coupled to the battery, and a battery current from a current sensor coupled to the battery;
wherein the battery gauge integrated circuit is further configured to determine a charging current for charging the battery based on a charging voltage in which a potential of the anode electrode is less than a lithium metal potential of the lithium-ion battery, including calculating an open cell anode potential, calculating an anode resistance of the battery, and calculating the charging current proportional to the calculated open cell anode potential divided by the calculated anode resistance.

25. The system of claim 24, wherein the charging current is computed to be a maximum charging current that will result in an open cell anode voltage that avoids lithium plating.

* * * * *